US006077084A

United States Patent [19]

Mino et al.

[11] Patent Number: 6,077,084

[45] Date of Patent: Jun. 20, 2000

[54] KARAOKE SYSTEM AND CONTENTS STORAGE MEDIUM THEREFOR

[75] Inventors: Hiroshi Mino, Hoya; Masao Toyosawa, Tokyo, both of Japan

[73] Assignee: Daiichi Kosho, Co., Ltd., Tokyo, Japan

[21] Appl. No.: 09/048,600

[22] Filed: Mar. 26, 1998

[30] Foreign Application Priority Data

| | | | |
|---|---|---|---|
| Apr. 1, 1997 | [JP] | Japan | 9-083040 |
| Apr. 11, 1997 | [JP] | Japan | 9-094060 |

[51] Int. Cl.[7] .................... G09B 5/00; G10H 1/36

[52] U.S. Cl. .................... 434/307 A; 434/307 R; 84/610; 386/105; 369/32

[58] Field of Search .................... 434/307 R–309, 434/318, 365; 84/477 R, 601–610, 625, 630, 631, 645, 650; 381/61, 63, 118; 369/275.3, 32, 47, 48, 49, 58, 59; 386/55, 96, 97, 102, 105; 360/72.2, 33.01, 77.01; 382/302, 307; 348/7, 9, 12, 478, 571, 589, 688

[56] References Cited

U.S. PATENT DOCUMENTS

| | | | |
|---|---|---|---|
| 3,250,747 | 5/1966 | Tsumura | 434/307 A |
| 5,157,739 | 10/1992 | Masaki et al. | 382/307 |
| 5,247,126 | 9/1993 | Okamura et al. | 434/307 A |
| 5,525,062 | 6/1996 | Ogawa et al. | 434/307 A |
| 5,574,243 | 11/1996 | Nakai et al. | 84/609 |
| 5,588,842 | 12/1996 | Nishimura et al. | 434/307 A |
| 5,768,396 | 6/1998 | Sone | 381/61 |
| 5,899,699 | 5/1999 | Kamiya | 434/307 A |
| 5,902,115 | 5/1999 | Katayama | 434/307 A |
| 5,914,930 | 6/1999 | Sasaki et al. | 369/275.3 |
| 5,931,679 | 8/1999 | Funahashi et al. | 434/307 A |
| 5,980,262 | 10/1992 | Tseng et al. | 434/307 A |

*Primary Examiner*—Joe H. Cheng
*Attorney, Agent, or Firm*—Barnes & Thornburg

[57] ABSTRACT

A karaoke system capable of performing distribution or delivery of new music without delay and providing high quality karaoke musical accompaniment and video image dedicated for each music well harmonized with the content of each music is disclosed. The karaoke system reproduces a recorded musical accompaniment of a music to sing together with a composite image of lyric words and background image. The system reads out the reproduction type data for the musical accompaniment and the lyric display data of the requested music for synchronous process by the reproduction type data decoding processing means and the lyric display processing means when the reproduction type data of the musical accompaniment is registered in the database, and reads out the synthesis type data, the lyric display data and the image borrowing scenario data of the requested music for synchronous process by the music generation processing means, the lyric display processing means and the video only reproduction mode processing means when the reproduction type data of the musical accompaniment of the requested music is not in the database.

10 Claims, 3 Drawing Sheets

KARAOKE SYSTEM AND CONTENTS STORAGE MEDIUM THEREFOR

BACKGROUND OF THE INVENTION

1. Field of the Invention

The present invention relates generally to a karaoke system for a pre-recorded musical accompaniment for singing. More specifically, the invention relates to a karaoke system which can reproduce a pre-recorded musical accompaniment through a speaker, and, in conjunction therewith, can display lyric words and a background video image corresponding to a mood of the music to be sung in synchronism with progress of the music.

2. Description of the Related Art

[Primary Technology Immediately Before Appearance of Communication Karaoke]

Karaoke system can be classified into a several kinds depending upon types of contents (software of karaoke). One of typical karaoke system is a type called a Laser Karaoke (tradename). In this type of apparatus, the contents are prepared and recorded in a recording medium in the following manner.

A musical accompaniment for singing is actually played and recorded (an audio signal is recorded). On the other hand, video image suited with a mood of the music is actually filmed and edited. The video image thus prepared will be hereinafter referred to as "background video image". Lyric words of the music to be sung are superimposed on the background video image so as to be advanced in synchronism with progress of the musical accompaniment to be reproduced. Such background vide image together with the lyric words will be hereinafter referred to as "lyric accompanying image".

As a storage medium, an optical analog video disk called as a laser disc (tradename) has been used. On the optical analog video disk, a composite signal, in which an analog audio signal of the musical accompaniment, and an analog vide signal of the lyric accompanying image dedicated for the corresponding musical accompaniment are superimposed with an appropriate modulation, is recorded. Such disk is replicated in large amount for distribution to load on a large number of the karaoke system.

By means of a video disk player in the karaoke system, a predetermined track on the disk containing a music desired to sing is reproduced. Then, the musical accompaniment of the desired music is reproduced through the speaker. At the same time, in synchronism with reproduction of the musical accompaniment, the lyric accompanying image is reproduced on a CRT display.

In another typical karaoke system, a digital storage medium standardized as a video CD (originally, a video CD standard is an advanced type of an initial karaoke CD standard). Production process of the contents is basically the same as those of the foregoing laser karaoke type. Namely, the musical accompaniment is actually played and recorded, and the lyric accompanying image is filmed and edited.

Then, according to a MPEG1 (Moving Picture Experts Group 1) standard, the audio signal of the musical accompaniment is converted by a digital compression coding process, and the video signal of the lyric accompanying image is converted by digital compression coding process for recording on the video CD in multiplexed manner. Such disk is replicated in large amount for distribution to load on a large number of the karaoke systems.

By means of a CD-ROM player in the karaoke system, a predetermined track on the disk containing a music desired to sing is reproduced. Then, the musical accompaniment of the desired music is reproduced through the speaker. At the same time, in synchronism with reproduction of the musical accompaniment, the lyric accompanying image is reproduced on a CRT display.

[Communication Karaoke]

A communication karaoke is a recent primary system. The communication karaoke system is significantly different from the foregoing two types in a mechanism for generating the musical accompaniment. Musical software for a typical communication karaoke system is produced by a technology of MIDI (Music Instrument Digital Interface) instrument or DTM (Desktop Music) by a personal computer, and express music in a data format according to the MIDI standard. As is well known, the MIDI data is not the digitized audio signal but a control data sequence for generating an audio signal of the music by controlling a synthesizer in time series.

Comparing the digital audio data (hereinafter referred to as "DA data") generated by digital compression coding of the musical accompaniment recorded by orchestration of instruments and the MIDI data generating the same musical accompaniment by the synthesizer simulating substantially the same orchestration of the instruments, the MIDI data has much smaller data amount than the digital audio data. However, it is difficult to synthesize a human voice chorus with realistic feeding by the synthesizer. Therefore, in many cases, a PCM data generated by digital recording a human voice chorus is accompanied with the MIDI data of the musical accompaniment. Even in total of the MIDI data and the PCM data, the data amount is much smaller than the digital compression coded digital audio data.

On the other hand, expression of the musical accompaniment primarily based on the MIDI data including mechanism for partially adding the digital recorded data (PCM data) such as the human voice chorus and so forth will be hereinafter referred to as a karaoke generation data. To this karaoke generation data, the lyric display data is added. The lyric display data is a graphics processing data for displaying the lyric words in superimposing manner. In the lyric display data, expression data, such as a lyric word sequence, a display layout data, display sequence data, singing timing guidance and so forth may be contained.

Since the karaoke generation data can express the karaoke musical accompaniment with quite small data amount (accompanied lyric display data is sufficiently small in the data amount), a compact and inexpensive hard disk drive for a personal computer may be used even for a karaoke database in a scale containing in excess of ten thousands of music. In the same reason what the data amount is satisfactorily small, a communication karaoke system, in which karaoke software (Karaoke generation data and the lyric display data) of new music can be distributed from a host system to karaoke terminal systems spread in wide area through a telephone network.

It should be noted that even in the communication karaoke system, it is typical to use a package medium for karaoke software (Karaoke generation data and the lyric display data) for a huge amount of existing musics. Namely, the CD-ROM recording the karaoke software of the existing music is replicated in large amount for loading in the CD-ROM player upon shifting of the karaoke terminal systems. Therefore, communication system is used as means for supplementing the karaoke software of new music not contained in the disk.

The communication karaoke system is a large scale network, in which huge number of the karaoke terminal systems spread in a wide area throughout the country and a host system managed by a business proprietor are connected through a communication network, and is a multimedia system handling audio information, character image information and/or moving picture image. In addition to the feature that the software of the new music can be supplied quickly, various applied functions utilizing a network resource has been realized. For instance, the business proprietor of the communication karaoke may collect operation record of respective terminal systems through the host system, perform inspection of respective terminal systems, remote control each individual terminal system on the basis of the operation record and content of contract. Thus, useful and high level operation system or maintenance management system directly associated with karaoke business can be realized. Furthermore, various new entertainment service, information service associated with use environment and not directly related to karaoke play, can be thought of to evaluate toward an intelligent entertainment system highly utilizing the network resource.

The karaoke musical accompaniment generated by controlling a synthesizer by the MIDI data is inherently lower in quality and atmosphere as a music and a tone quality in comparison with the reproduced sound of the digital audio data of the musical accompaniment. In certain genre of music and orchestration of the instruments, the difference of the reproduced sound quality becomes critical negative factor to significantly lower evaluation of a singer and/or listener.

On the other hand, it is a great fun for members enjoying karaoke singing, especially for listeners to watch a video image displayed in the background of the lyric words. Enjoying harmony of the content of the music being sung and the content of the displayed video image, is one of significant entertainment factor. In the communication karaoke, background image is selected with appropriately using images in a common image database. Therefore, even when a measure is taken to avoid apparent mismatching of the content of the music and the content of the image, the quality is significantly lowered in comparison with the system using the lyric accompanying image dedicate for the corresponding music.

In the recent years, a technology for redundancy compression of the audio and video data and a digital signal processing technology concerning transmission has been abruptly progressed. Therefore, it is not technically difficult to establish the communication karaoke system, in which the recorded high quality karaoke musical accompaniment and the lyric accompanying image are transmitted in a form of MPEG audio and video data.

However, it requires much higher cost and significant time to record actual play of the karaoke musical accompaniment with a desired orchestration of the instruments in comparison with generation of the karaoke generation data primarily by the MIDI. Recording all of new music created from time to time with actually playing them for recording high quality karaoke musical accompaniment without causing significant delay, is significant burden for the software provider (business proprietor of karaoke).

Greater burden for the software provider is production of the lyric accompanying image dedicated for each music. In the production process, scenario adapted to the content of each music is prepared, and a short silent film is filmed and edited based on the scenario. This is quite significant work. It is not easy to produce the lyric accompanying images dedicated for respective music created in the rate of several tens per month without significant delay. Therefore, it is quite difficult to maintain distribution speed of the new music as in the current communication karaoke.

SUMMARY OF THE INVENTION

The present invention has been worked out in view of the problems in the prior art set froth above. Therefore, it is an object of the present invention to provide a karaoke system which can perform distribution or delivery of new music without delay and can provide high quality karaoke musical accompaniment and video image dedicated for each music well harmonized with the content of each music.

Another object of the present invention is to provide contents storage medium for a karaoke system, which can store contents of information expression type which can be produced in a short period and low cost and contents of information expression type including a high quality karaoke musical accompaniment and a lyric accompanying image dedicated for the music well harmonized with the music, requiring a long production period and high cost depending upon condition of acceptance of each music in the market, such as what type of the consumers are in favor of the music in question, prospect how long the popularity of the music in question can be maintained and so forth, are rationally admixed in the same large capacity storage medium to achieve a quality of the contents and the cost at high level and a rational data structure for the contents reproduction system of the karaoke system.

According to one aspect of the present invention, a karaoke system for reproducing a recorded musical accompaniment of a music to sing together with a composite image of lyric words and background image, comprises:

a database including reproduction type data of the musical accompaniments and the composite images of a large amount of music, synthesis type data, lyric display data and management data thereof, each of the reproduction type data of the musical accompaniments comprising an audio data of each music generated by recording while the musical accompaniment is actually played and a video data of the corresponding music generated from an analog video data filmed adapting to the content of the music, each of the synthesis type data containing data for generating the musical accompaniment by controlling a synthesizer, the lyric display data being data for displaying a sequence of lyric words in synchronism with progress of the musical accompaniment, database managing means for accessing the database and taking out arbitrary data, reproduction type data processing means for processing the reproduction type data of musical accompaniment and synchronously outputting the musical accompaniment and the composite image through an audio reproduction system and a video reproduction system, music generation processing means for controlling the synthesizer on the basis of the synthesis type data and outputting a generated musical accompaniment through the audio reproduction system, and lyric display processing means for sequentially displaying the lyric word image on a display of the video reproduction system on the basis of the lyric display data, the reproduction type data processing means including execution means of a video only reproduction mode for partially reproducing only video data in the audiovisual data for musical accompaniment for outputting a desired part of selected background image of a selected music from the video reproduction system, image borrowing scenario data expressing identification information of a plurality of the desired parts of selected background images to be borrowed in time series being recorded corresponding to the synthesis type data, the recorded musical accompaniment reproducing system reading out the reproduction type data for the musical accompaniment and the lyric display data of the requested music for synchronous process by the reproduction type data processing means and the lyric display processing means when the reproduction type data of the musical accompaniment is registered in the database, the recorded musical accompaniment reproducing system reading out the synthesis type data, the lyric display data and the image borrowing scenario data of the requested music for synchronous process by the music generation processing means, the lyric display processing means and the video only reproduction mode processing means when the reproduction type data of the musical accompaniment of the requested music is not in the database.

In the construction set forth above, the storage means may include an optical disk dedicated for reading and storing the audio-visual data of musical accompaniments and the lyric display data corresponding to the audio-visual data. The musical accompaniment generation data, the lyric display data corresponding to the musical accompaniment generation data and the image borrowing scenario data may be stored in the optical disk. The storage means may store the database contained in a rewritable hard disk.

According to another aspect of the present invention, a contents storage medium for a karaoke system recording an musical accompaniment of a desired music requested, a sequence of lyric words corresponding to the musical component adapted for a mood of the content of the requested music, the contents storage medium being a large capacity storage medium, the contents storage medium, comprises:

reproduction type contents including an audio-visual data of musical accompaniment data and a lyric word data, the musical accompaniment data containing an audio data generated by an analog signal sampled from actual play of the musical accompaniment and a video signal containing a background image suited with the content of each music, in multiplexed, and the lyric display data being data for displaying a sequence of lyric words in superimposition in synchronism with progress of the musical accompaniment; and synthesis type contents including a synthesizer control data, the lyric display data and an image borrowing scenario data, the synthesizer control data being data for controlling a synthesizer incorporated in the recorded musical accompaniment reproducing system for generating the musical accompaniment, the lyric display data being data for displaying the lyric word sequence in superimposition in synchronism with progress of the musical accompaniment, and the image borrowing scenario data being data for expressing identification information of a plurality of image parts to be borrowed for editing the background image with partially borrowing the background image of the music of the audio-visual data.

In the construction set forth above, in a part of the data of the synthesis type music, a digital recorded data of human voice chorus and the like to be partially added to the musical accompaniment generated by the synthesizer control data may be included.

BRIEF DESCRIPTION OF THE DRAWINGS

The present invention will be understood more fully from the detailed description given herebelow and from the accompanying drawings of the preferred embodiment of the present invention, which, however, should not be taken to be limitative to the invention, but are for explanation and understanding only.

In the drawings.

DESCRIPTION OF THE PREFERRED EMBODIMENT

The present invention will be discussed hereinafter in detail in terms of the preferred embodiment of the present invention with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to avoid unnecessarily obscure the present invention.

[Central Part of a Control System of Karaoke system]

Figure 1:
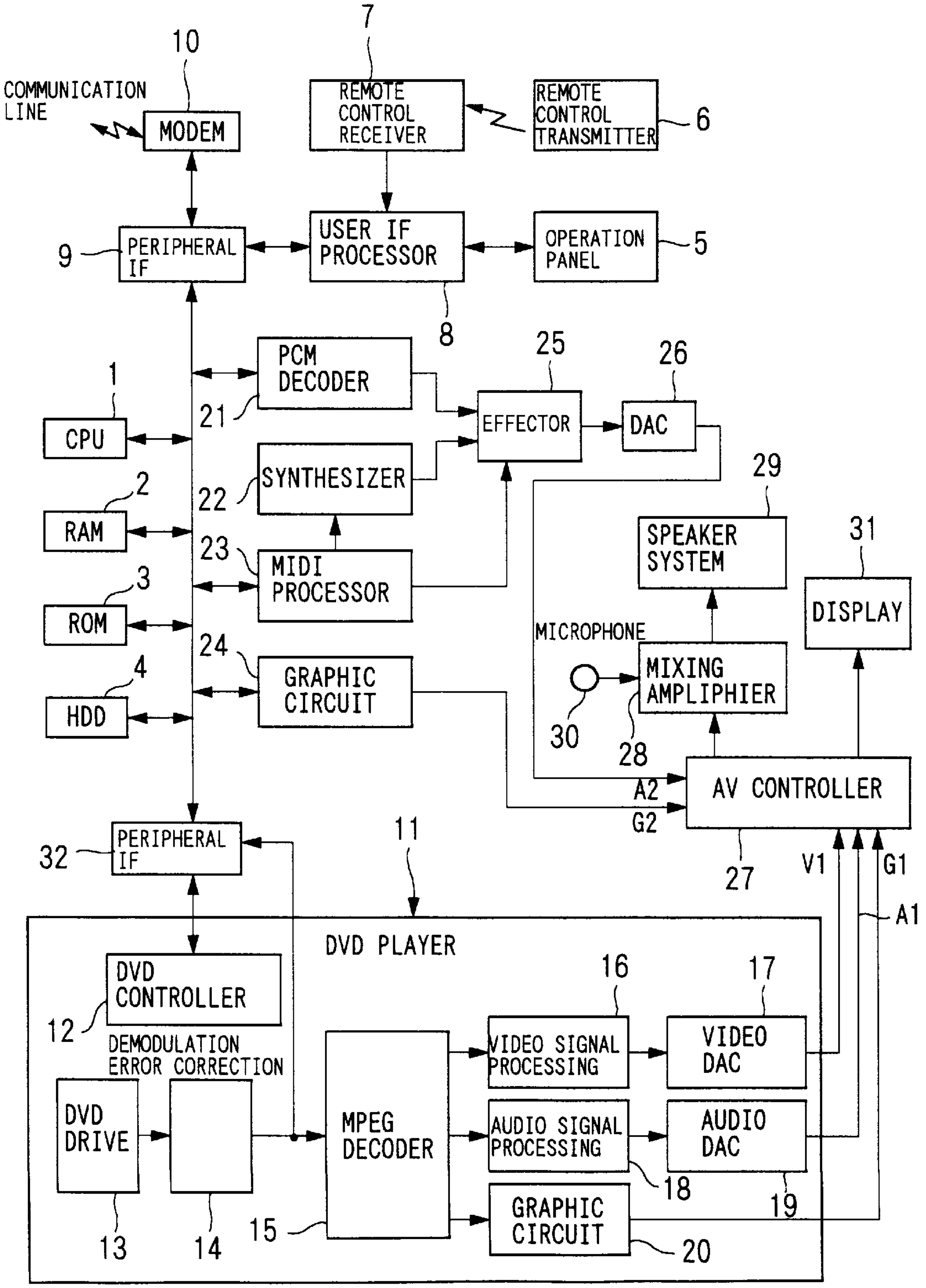
FIG. 1 is a block diagram showing a general construction of one embodiment of a karaoke system according to the present invention.

FIG. 1 shows a general construction of one embodiment of a karaoke system according to the present invention. A computer including CPU 1, RAM 2, ROM 3, HDD (hard disk) 4 and so forth, as primary components, concentrically control the shown embodiment of the karaoke system. In conjunction therewith, the computer also serves for performing various data processing. In a main body of the system, an operation panel 5 including a display and a keyboard, for user interface, is provided. Also, a remote control receiver 7 corresponding to a remote control transmitter 6 is also provided in the main body. The operation panel 5 and the remote control receiver 7 are connected to a bus of CPU 1 via a user IF (interface) processor 8 and a peripheral IF (interface) processor 9. A user of the karaoke performs various operation inputs, such as selection of music to sign through the operation panel 5 or the remote control transmitter 6. The content of operation and response information of the system responsive to the operation input are displayed on the operation panel 5. On the other hand, CPU 1 is connected to a communication network through the peripheral IF circuit 9 and a modem 10, and also serves as a terminal system of the communication karaoke system.

[Reproduction type and Synthesis type]

Most of the contents of the karaoke is recorded in a DVD (digital versatile disk) in a DVD player 11. A part of the contents are stored in the HDD 4. The karaoke contents in this system contains a reproduction type and a synthesis type between which mechanisms of information expression are significantly different.

The contents of the reproduction type is consisted of a karaoke AV data and a lyric display data. The karaoke AV data is a data, in which the audio data per each music recorded while actually played and converted by digital compression coding, and the video data filmed and edited adapting to the mood of the corresponding music as the background image with superimposing the lyric words and converted into the digital compression coding are multiplexed. The data format is established according to the MPEG standard. The lyric display data is the data for graphic process for displaying the lyric words in synchronism with progress of the musical accompaniment in superimposing manner, and includes display information, such as the lyric word sequence, the display layout, the display sequence, a guidance of singing timing and so forth.

As the data recording type of the reproduction type music, the lyric display data is recorded immediately before the karaoke AV data, or, in the alternative, the lyric display data for a large number of music are concentrically recorded. In the further alternative, it is also possible to record the lyric display data over the karaoke AV data in multiplexed manner.

The contents of the synthesis type is a set of MIDI data for generating a synthesized sound of karaoke musical accompaniment by controlling a synthesizer, a digital recording data (PCM data) of human voice chorus or the like to be partially added to the musical accompaniment, the lyric display data and image borrowing scenario data. Recording format of the data set may be the same as the conventional communication karaoke system, and also may be other format. It should be noted that a set of the MIDI data and the PCM data to be the base of the karaoke musical accompaniment, hereinafter referred to as karaoke generation data.

The lyric display data is a data for graphic process for displaying the lyric words in synchronism with progress of the karaoke musical accompaniment, and includes the lyric word sequence, the display layout, the display sequence, the guidance of the singing timing and so forth.

The image borrowing scenario data is a data expressing the identification information of a plurality of image parts to be borrowed in order to edit the background image partly borrowing background image of respective music of the karaoke AV data (the primary element of the reproduction type contents). This will be discussed later.

[Karaoke Database]

A database of the karaoke contents of a huge number of reproduction type and synthesis type music is established with taking a plurality of DVD reproduced by a DVD drive 13 as a major digital storage medium, and the HDD 4 as an auxiliary digital storage medium. The database is managed primarily by CPU 1. The DVD to be used in the shown embodiment is a dedicated optical disk (DVD-ROM). The disk recorded the data is replicated in a large amount to be loaded to the DVD drive of the shown karaoke system.

There are over ten thousands of existing music as the karaoke contents. In addition, several tens new music are created every month. For the new music, the karaoke contents are prepared in the synthesis type and distributed to each individual karaoke system from the host system managed by the proprietor of karaoke business through the communication network of the communication karaoke system. In each individual karaoke system, the new music data of synthesis type distributed from the host system is accumulated in the HDD 4 to add a management record of each new music to an index file of the database.

Concerning the existing music, there are the music produced in the reproduction type and music produced in the synthesis type and those different types of music are recorded in a plurality of DVD's in an appropriately separated condition. For standard music and so forth which fold constant popularity for a long period, and for which high quality sound and well suited picture image is required, the contents are prepared in the reproduction type. Of course, production cost of the reproduction type contents is much higher than that of the synthesis type. Therefore, for relatively old music which has lesser occurrences to be requested for playing or singing, and relatively new music future popularity of which is not certain, the contents are produced as the synthesis type contents. The synthesis type contents is less expensive in production of the karaoke generation data and no dedicated background image is produced. Therefore, production cost of the synthesis type contents can be much lower than that of the reproduction type contents.

It should be noted that when the DVD title recording new contents is additionally distributed, it will not create any problem to re-making the music originally recorded as the synthesis type contents in the old DVD but obtained popularity thereafter, as the reproduction type contents.

CPU 1 generates an index file in the HDD 4 in order to manage the karaoke database and updates the content thereof from time to time. In the index file, management records of respective music with taking music IDs as keys, are concentrically stored. Also, in the management record of respective music, information for distinguishing the reproduction type contents and the synthesis type contents, and information indicative of storage portion of the music data are included. Of course, it is possible to contain titles of the music, singer names, author name, lyric writer and so forth, as well as various attribute information depending upon intent, in the management record.

In respective headers of a plurality of DVD titles loaded in the DVD derive 13, the management information is recorded. In the header management information, recorded positions in the disks are concentrically described. CPU 1 reads out the header management information of respective DVD titles loaded in the DVD drive 13 and prepares the foregoing index file on the basis of the read contents. As set forth above, the new music data of the synthesis type distributed from the host system are accumulated in the HDD 4 and the management records of those new music are added in the index file.

As the digital storage medium of the karaoke database, not only the DVD dedicate for reproduction and the HDD, various other media may be used. For example, use of a re-writable optical disk called as the DVD-RAM, an additionally writable optical disk called as CD-R, a magneto-optic disk, a mini disk (MD), an IC memory and so forth may be used. The music data of the synthesis type distributed from the host system by the communication karaoke system may be written in a writable medium other than the HDD 4. Also, as long as sufficiently high communication speed can be attained, it may also be possible to distribute the reproduction type contents from the host system to a plurality of karaoke system to accumulate in the DVD-RAM or the like.

[Data Structure of DVD Title]

Figure 3:
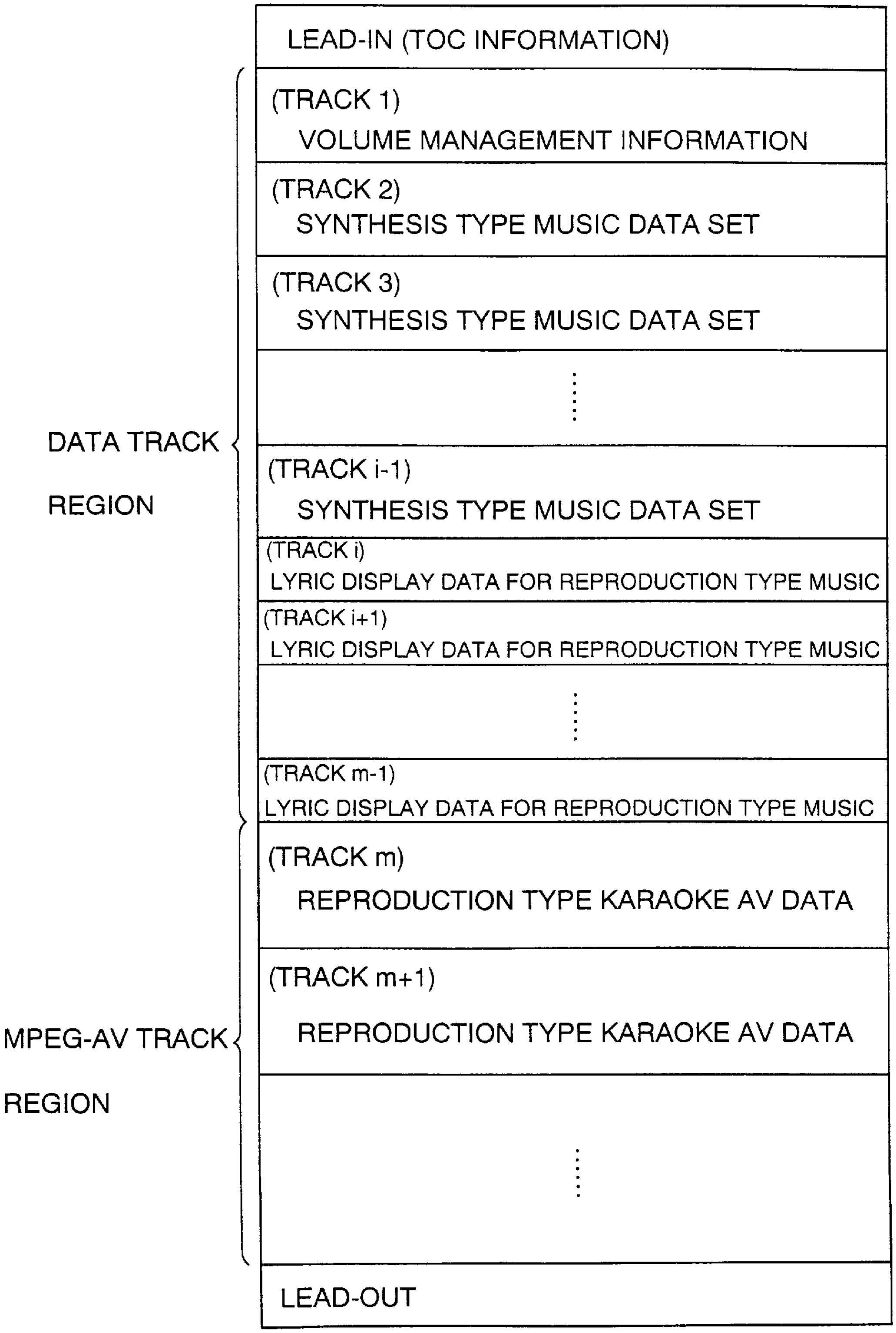
FIG. 3 is a schematic diagram showing a data structure of a contents storage medium according to one embodiment of the present invention.

A data structure of a DVD title contained in a DVD disk is shown in FIG. 3. A lead-in is followed by a data track region, an MPEG-AV track region, and finally by a lead-out. The lead-in stores initial addresses (TOC information) of the respective tracks. In the data track region, the first track 1 contains the above volume management information. Data sets of the respective synthesis type music data, each containing MIDI data, PCM data, lyric display data, and image borrowing scenario data, are stored in the second and the following tracks. Lyric display data for the reproduction type data are recorded subsequent to the synthesis type data sets. In the MPEG-AV track region, karaoke AV data for the respective reproduction type music data are stored. The lead-out contains an identification code for indicating an end of data.

[Data Processing System of Reproduction Type Contents]

A DVD controller 12 concentrically controls each part of a DVD player 11. The DVD controller 12 is connected to the CPU 1 via a peripheral IF circuit 32 to operate the DVD player 11 according to commands from CPU 1.

The DVD drive 13 is constructed with arranging a plurality of disk changer type drives in parallel and can switch from reproducing operation of one disk to reproducing operation of another disk almost instantly. An output of the DVD drive 13 is at first processed by a demodulation and error correction circuit 14 and input to an MPEG decoder 15. On the other hand, a bit stream output of the demodulation and error correction circuit 14 fed to the bus of the CPU 1 via the peripheral IF circuit 32.

When a command is provided to the DVD controller 12 from the CPU 1 for reproducing data for a certain music (karaoke AV data and lyric display data) of the reproduction type, the DVD player 11 performs the following operation under control of the DVD controller 12.

The disk containing the designated music data is reproduced by the DVD drive 13. At first, the lyric display data of the music to be sung is read out and transferred to a graphic circuit 20 via a MPEG decoder 15. Then, the karaoke AV data of the music is reproduced and input to the MPEG decoder 15. The karaoke AV data is separated into the audio data and the video data by the MPEG decoder 15. The audio data and the video data are decoded by an audio signal processing circuit 18 and a video signal processing circuit 16. Then, an analog signal of the karaoke musical accompaniment is output from a D/A converter 19. In synchronism therewith, the analog signal of the background image is output from a D/A converter 17. In synchronism with these processes, the lyric display data is processed by the graphic circuit 20 to generate a graphic data of the lyric word image varying according to progress of the karaoke musical accompaniment.

Thus, the audio signal A1 of the karaoke musical accompaniment, the video signal V1 of the background image and the graphic data G1 of the lyric word image are output from the DVD player 11 to the AV controller 27. The audio signal A1 is amplified together with a singing voice audio signal from a microphone 30 by a mixing amplifier to generate a sound, in which the singer's singing voice and the musical accompaniment are composed, through a speaker system 29. In conjunction therewith, the background image of the video signal is displayed on a display device 31. As well, the lyric word image of the graphic data G1 is also displayed on the display device 31 in superimposing manner.

[Data Processing System of Synthesis Type Content]

The CPU 1 receiving a request for the music to sing, the record of the requested music in the index file is obtained. If it is known that the requested music is recorded as the synthesis type contents, check is performed whether the requested music data is stored in the HDD 4 or in the DVD drive 13. Then, a sequence of data of the music is read out from the HDD 4 or the DVD drive 13 to write in a work area of RAM 2.

When the music data is stored in the DVD drive 13, the CPU 1 commands the DVD controller 12 via the peripheral IF circuit 32 to reproduce the corresponding portion of the DVD title to obtain a reproduced signal past through the demodulation and error correction circuit 14, through the peripheral IF circuit 32 to write in the work area of RAM 2.

The synthesis type music data is a set of MIDI data for generating a synthesized sound of karaoke musical accompaniment by controlling a synthesizer 22, a digital recording data (PCM data) of human voice chorus or the like to be partially added to the musical accompaniment, the lyric display data and the image borrowing scenario data. Among data developed in the work area of RAM 2, the MIDI data is transferred to a MIDI processor 23, the PCM data is transferred to a PCM decoder 21, the lyric display data is transferred to the graphic circuit 24, and the image borrowing scenario data is transferred to the DVD controller 12 via the peripheral IF circuit 32.

By controlling the synthesizer 22 and an effector 25 according to the given MIDI data provided by the MIDI processor 23, the analog audio signal of the karaoke musical accompaniment expressed by the MIDI data is created from the D/A converter 26. In synchronism with the process of generation of the karaoke musical accompaniment, the PCM data of the human voice chorus or so forth is decoded and the output thereof is mixed with the karaoke musical accompaniment by the effector 25. The analog audio signal A2 of the musical accompaniment added the human voice chorus or the like is output to the AV controller 27 from the D/A converter 26. By processing the lyric display data transferred from the graphic circuit 24 in synchronism with the music generation process, the graphic data G2 of the lyric word image varying in accordance with or in synchronism with progress of karaoke musical accompaniment can be output from the D/A converter 26.

The audio signal A2 of the karaoke musical accompaniment output from the D/A converter 26 and the graphic data G2 output from the graphic circuit 24 are supplied to the AV controller 27. The AV controller 27 is also controlled by the CPU 1 and is switched the signal paths so that the audio signal A2 is amplified by the mixing amplifier 28 and supplied to the speaker system 29 for reproducing the karaoke musical accompaniment generated by the synthesizer 22 through the speaker system 29. Simultaneously, the lyric word image by the graphic data G2 is displayed in superimposition.

In the foregoing description, discussion has not been given concerning what is displayed as the background image of the lyric word image based on the graphic data. While the video signal V1 output from the DVD player 11 during reproduction process of the synthesis type music is displayed on the display 31 through the AV controller 27, this image becomes the background image of the lyric word image. The image borrowing scenario data contained in the music data of the synthesis type defines how the background image is selected among the DVD titles and output. This will be discussed in greater detail hereinafter.

[Background Borrowing Scenario Data]

Assuming that the reproduction type contents for five thousands music, for example, are recorded in a plurality of DVD titles loaded in the DVD drive 13. For these music, dedicated video image is recorded in a form of the AV data. Assuming that an average recording period of the background image of each music is four minutes, the image data for 5,000×4 minutes is contained. By borrowing such huge amount of image data, the background image upon playing of the synthesis type contents is created.

Since the background image of each music of the reproduction type does not contain the lyric word image as set forth above, such background image can be borrowed as the background image of other music. On the other hand, the background image of each music is stored on the disk in a form of MPEG audio and video data. The background image for one music is separated into a plurality of parts in a concept of chapter. Each image part is distinguished by a part ID in the concept of chapter number.

The DVD controller 12 has control means operating the DVD player 11 in a video only reproduction mode. The video only reproduction mode is an operational mode for partially reproducing only video data in the karaoke AV data recorded in the DVD title. By providing an operation command of the video only reproduction mode for the DVD controller 12 from the CPU 1 and providing the music ID and the part ID, only designated part of the background image of the designated music is reproduced by the DVD player 11 to be output to the D/A converter 17.

The image borrowing scenario data contained in the synthesis type music data expresses identification information of a plurality of image parts to be borrowed in a time series for editing the background image by partially borrowing the background images of the karaoke AV data of the reproduction type music. Thus, the image borrowing scenario data is a data sequence arranging sets of the music ID and the part ID in time series.

Upon playing the synthesis type music, the DVD player 11 is operated in the video only reproduction mode according to the image borrowing scenario data contained in the music data. The video signal V1 sequentially output by the foregoing operation is displayed on the display device 31 as the background image of the lyric word as the graphic signal G2.

Figure 2:
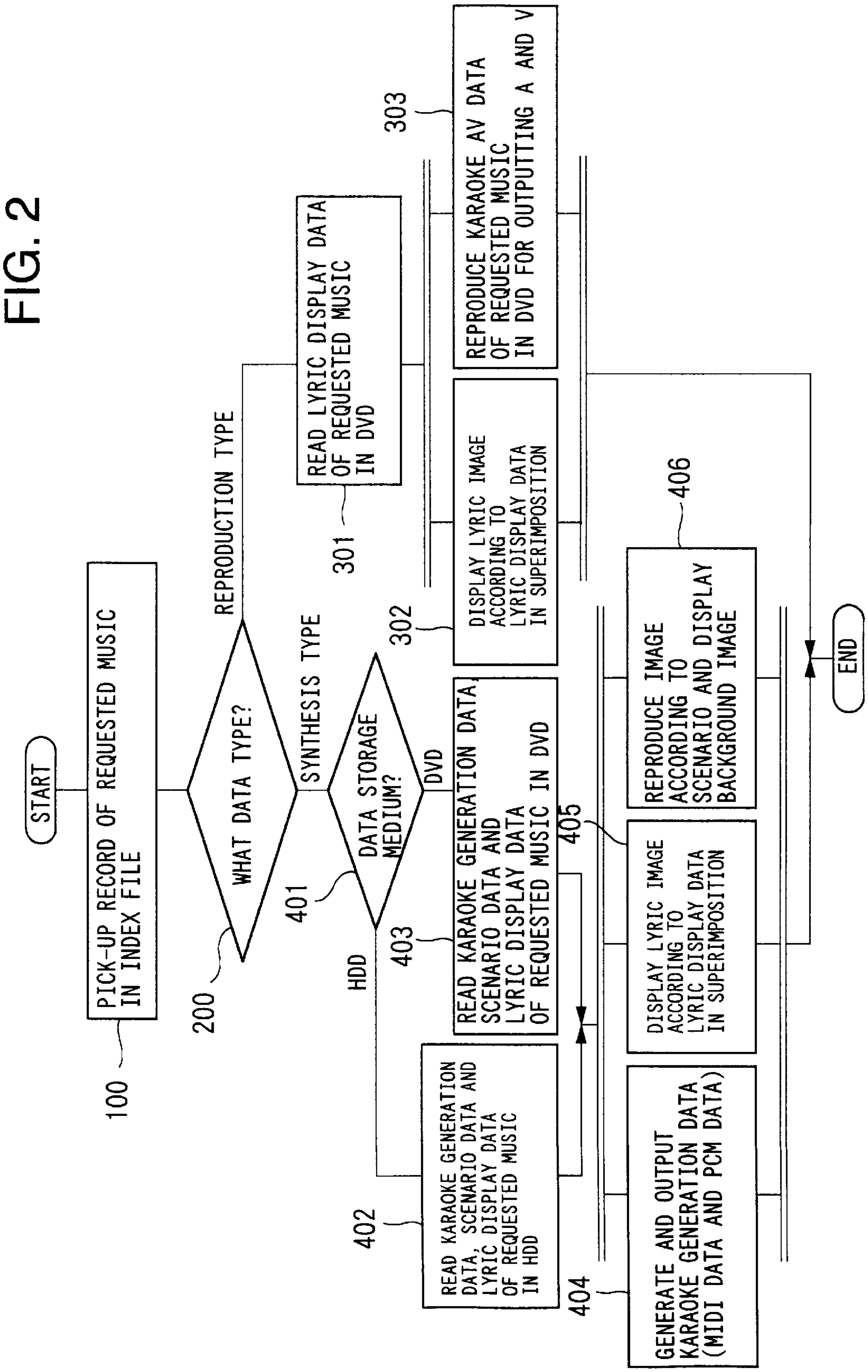
FIG. 2 is a f lowchart showing a process of a basic operation of one embodiment of the karaoke system according to the present invention.

The operation set forth above has been summarized in a flowchart of FIG. 2. The process shown in FIG. 2 is triggered in response to entry of a request for playing of the selected one of musical accompaniment together with the lyric words and the background image.

In response to entry of the request, a record corresponding to the requested music in the index file is picked up at step 100. Then, at step 200, data type of the requested music is checked. If the data type is the reproduction type, process is advanced to step 301 to read out the lyric display data of the requested music from the DVD. Then, the lyric image is generated according to the lyric display data for displaying in superimposing manner at step 302. Also, the karaoke AV data of the requested music is reproduced from the DVD to separately output the audio data and the video data at step 303.

On the other hand, when the data type of the requested music is the synthesis type, a portion where the MIDI data corresponding to the requested music is retrieved at step 401. If the storage portion is the HDD 4, the karaoke generation data, the lyric displaying data and the image borrowing scenario data of the requested music are read out from the HDD at step 402. If the storage portion is DVD, the karaoke generation data, the lyric displaying data and the image borrowing scenario data of the requested music are read out from the DVD at step 403. On the basis of data read at either step 402 or 403, the musical accompaniment is generated according to the karaoke generation data (MIDI data and the PCM data) at step 404, the lyric word image is generated according to the lyric display data and displayed on the display device at step 405, and the background image is reproduced according to the image borrowing scenario data by operating the DVD player for displaying the background image in superimposing manner with the lyric word image at step 406.

It will be more desirable to establish a database by recording common images not corresponded to the music as an appropriate DVD title (by setting the DVD title in the DVD drive 13), and to add the common image database to the function for using the background image upon playing the synthesis type music.

According to the present invention, by performing distribution of the new music without delay, it becomes possible to provide high quality karaoke musical accompaniment and the dedicated background image well harmonized with the content of the music can be provided. Namely, for standard music and so forth which fold constant popularity for a long period, and for which high quality sound and well suited picture image is required, the contents are prepared in the reproduction type. Of course, production cost of the reproduction type contents is much higher than that of the synthesis type. Therefore, for relatively old music which has lesser occurrences to be requested for playing or singing, and relatively new music future popularity of which is not certain, the contents are produced as the synthesis type contents. The MIDI type contents is less expensive in production of the karaoke generation data and no dedicated background image is produced. Therefore, production cost of the synthesis type contents can be much lower than that of the reproduction type contents. Particularly, upon playing of music of the latter type, the background image of the former type is displayed with borrowing the existing image quite effectively. In either type, the lyric word image on the basis of the lyric display data can be displayed on the display device according to progress of the musical accompaniment.

Although the present invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodied within a scope encompassed and equivalents thereof with respect to the feature set out in the appended claims.

What is claimed is:

1. A karaoke system for reproducing a recorded musical accompaniment of a music to sing together with a composite image of lyric words and background image, comprising:

a database including reproduction type data of said musical accompaniments and said composite images of a large amount of music, synthesis type data, lyric display data and management data thereof, each of said reproduction type data of said musical accompaniments comprising an audio data of each music generated by recording while said musical accompaniment is actually played and a video data of the corresponding music generated from an analog video data filmed adapting to the content of the music, each of said synthesis type data containing data for generating said musical accompaniment by controlling a synthesizer, said lyric display data being data for displaying a sequence of lyric words in synchronism with progress of said musical accompaniment;

database managing means for accessing said database and taking out arbitrary data;

reproduction type data processing means for processing said reproduction type data of musical accompaniment and synchronously outputting said musical accompaniment and said composite image through an audio reproduction system and a video reproduction system;

music generation processing means for controlling said synthesizer on the basis of said synthesis type data and outputting a generated musical accompaniment through said audio reproduction system; and lyric display processing means for sequentially displaying said lyric word image on a display of said video reproduction system on the basis of said lyric display data, said reproduction type data processing means including execution means of a video only reproduction mode for partially reproducing only video data in said audio-video data for musical accompaniment for outputting a desired part of selected background image of a selected music from said video reproduction system, image borrowing scenario data expressing identification information of a plurality of said desired parts of selected background images to be borrowed in time series being recorded corresponding to said synthesis type data, said recorded musical accompaniment reproducing system reading out said reproduction type data for said musical accompaniment and said lyric display data of a requested music for synchronous process by said reproduction type data processing means and said lyric display processing means when the reproduction type data of said musical accompaniment is registered in said database, and said recorded musical accompaniment reproducing system reading out said synthesis type data, said lyric display data and said image borrowing scenario data of said requested music for synchronous process by said music generation processing means, said lyric display processing means and said video only reproduction mode processing means when said reproduction type data of said musical accompaniment of said requested music is not in said database.

2. A karaoke system for reproducing a recorded musical accompaniment of a music to sing together with a composite image of lyric words and background image, comprising:

a database concentrically including reproduction type data of said musical accompaniments and said composite images of a large amount of music, synthesis type data, lyric display data and management data thereof, each of said reproduction type data of said musical accompaniments comprising an audio data of each music generated through digital compression coding of an analog musical data recorded while said musical accompaniment is actually played and a video data of the corresponding music generated through digital compression coding of an analog video data filmed adapting to the content of the music, in multiplexed manner, each of said synthesis type data primarily containing data for generating said musical accompaniment by controlling a synthesizer, said lyric display data being data for displaying a sequence of lyric words in synchronism with progress of said musical accompaniment, which lyric display data includes an expression information containing a lyric word sequence to be displayed, a display layout, a display sequence, a guidance for a singing timing;

database managing means for accessing said database and taking out arbitrary data;

reproduction type data decoding processing means for decoding said reproduction type data of musical accompaniment and synchronously outputting said musical accompaniment and said composite image through an audio reproduction system and a video reproduction system;

music generation processing means for controlling said synthesizer on the basis of said synthesis type data and outputting a generated musical accompaniment through said audio reproduction system; and lyric display processing means for sequentially displaying said lyric word image on a display screen of said video reproduction system on the basis of said lyric display data, said reproduction type data decoding processing means including execution means of a video only reproduction mode for partially reproducing only video data in said audio and video data for musical accompaniment for outputting a desired part of selected background image of a selected music from said video reproduction system, image borrowing scenario data expressing identification information of a plurality of said desired parts of selected background images to be borrowed in time series being recorded corresponding to said synthesis type data, said recorded musical accompaniment reproducing system reading out said reproduction type data for said musical accompaniment and said lyric display data of a requested music for synchronous process by said reproduction type data decoding execution means and said lyric display processing means when the reproduction type data of said musical accompaniment is registered in said database, and said recorded musical accompaniment reproducing system reading out said synthesis type data, said lyric display data and said image borrowing scenario data of said requested music for synchronous process by said music generation processing means, said lyric display processing means and said video only reproduction mode processing means when said reproduction type data of said musical accompaniment of said requested music is not in said database.

3. A karaoke system as set forth in claim 2, wherein said database is contained in a storage means selected from the group of an optical disk, a magnetic disk, a magneto-optic disk, and an IC memory.

4. A karaoke system as set forth in claim 2, wherein said reproduction type data include a karaoke audio-visual data formed according to a MPEG standard.

5. A karaoke system as set forth in claim 2, wherein said synthesis type data include a MIDI data for controlling said synthesizer.

6. A karaoke system as set forth in claim 5, wherein said synthesis type data further include a PCM data containing digital recorded data of human voice chorus.

7. A karaoke system as set forth in claim 3, wherein said storage means includes an optical disk dedicated for reading and storing said reproduction type data of musical accompaniments and said lyric display data corresponding to said reproduction type data.

8. A karaoke system as set forth in claim 7, wherein said optical disk is a digital versatile disk.

9. A karaoke system as set forth in claim 7, wherein said synthesis type data, said lyric display data corresponding to said synthesis type data and said image borrowing scenario data are stored in said optical disk.

10. A karaoke system as set forth in claim 3, wherein said storage means stores said database contained in a rewritable hard disk.

* * * * *